United States Patent [19]

Rowley

[11] 4,446,084

[45] May 1, 1984

[54] PLASTIC TUBE COUPLING AND APPARATUS FOR FORMING

[76] Inventor: William W. Rowley, 11524 Wilbert Rd., Chardon, Ohio 44024

[21] Appl. No.: 338,303

[22] Filed: Jan. 11, 1982

Related U.S. Application Data

[60] Continuation-in-part of Ser. No. 157,395, Jun. 9, 1980, Pat. No. 4,316,870, which is a division of Ser. No. 912,743, Jun. 5, 1978, abandoned.

[51] Int. Cl.³ .............................................. B29D 23/00
[52] U.S. Cl. .................................... 264/40.6; 264/296; 264/327
[58] Field of Search .............. 264/296, 320, 322, 40.6, 264/327; 425/393

[56] References Cited

U.S. PATENT DOCUMENTS 3,843,300 10/1974 McFarlane ..................... 264/322 X
4,140,739 2/1979 Cotten ............................. 264/322 X Primary Examiner—Thomas P. Pavelko
Attorney, Agent, or Firm—Maky, Renner, Otto & Boisselle

[57] ABSTRACT

Plastic tubing of extruded polybutylene and the like has an end reformed into a structural bulb sealing surface which includes a stop flange permitting the tube to be drawn into sealing engagement with a mating part. The tube end is reformed in a press or jig which includes two molds, with the tube end projecting through one mold and toward the other. The other mold is normally chilled or cooled but includes an I.D. mandrel or pin projecting therefrom. The pin is insulated from the other mold. The pin may be heated and/or cooled during the reforming cycle of the process to enable uniform heating of the projecting tube end from both the inside (I.D.) and outside (O.D.) of the tube end. The process and apparatus of the invention provides a more uniform and integral reformed tube end. The cycle time of the process may also be reduced resulting in greater productivity with less energy consumption.

26 Claims, 8 Drawing Figures

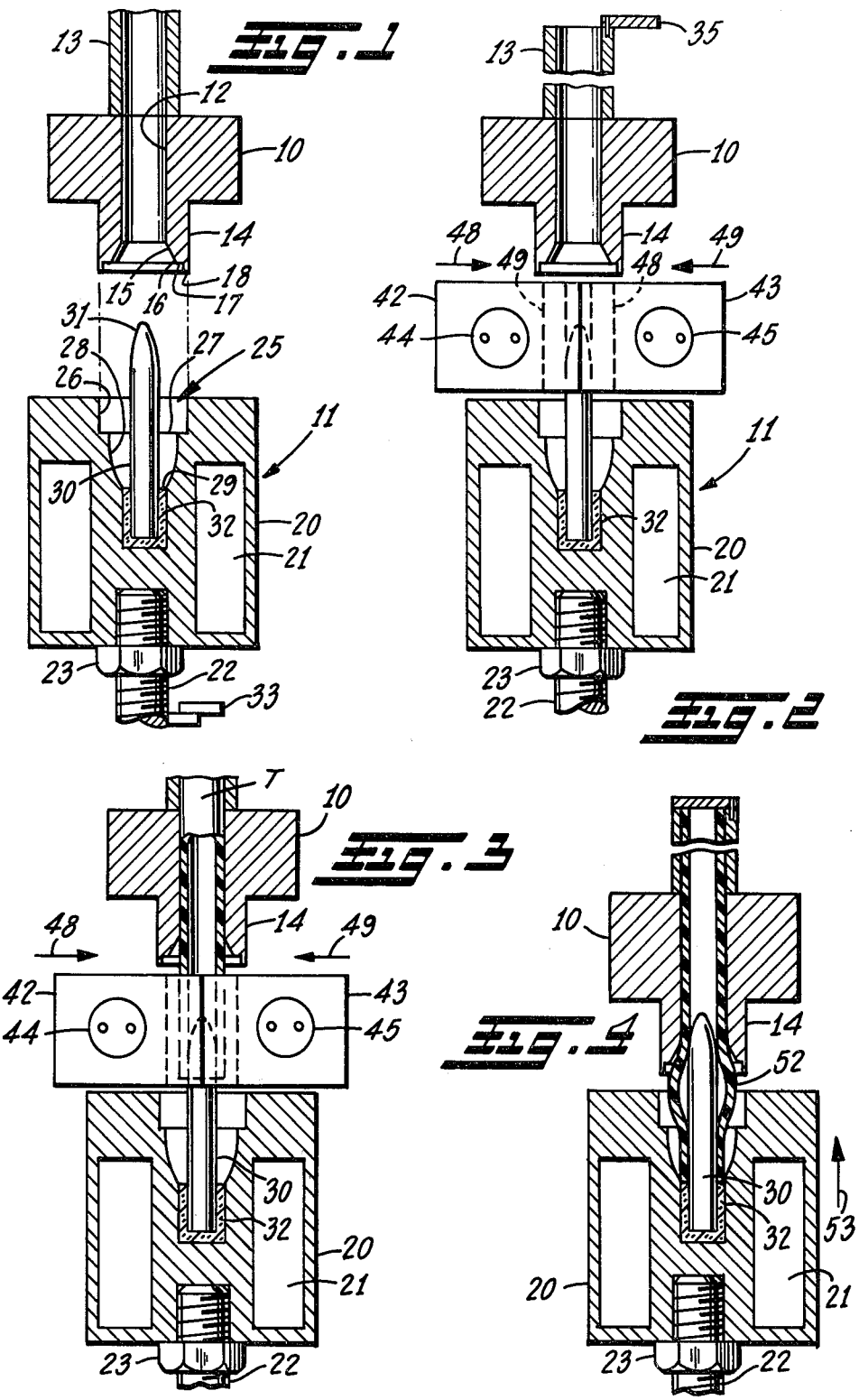

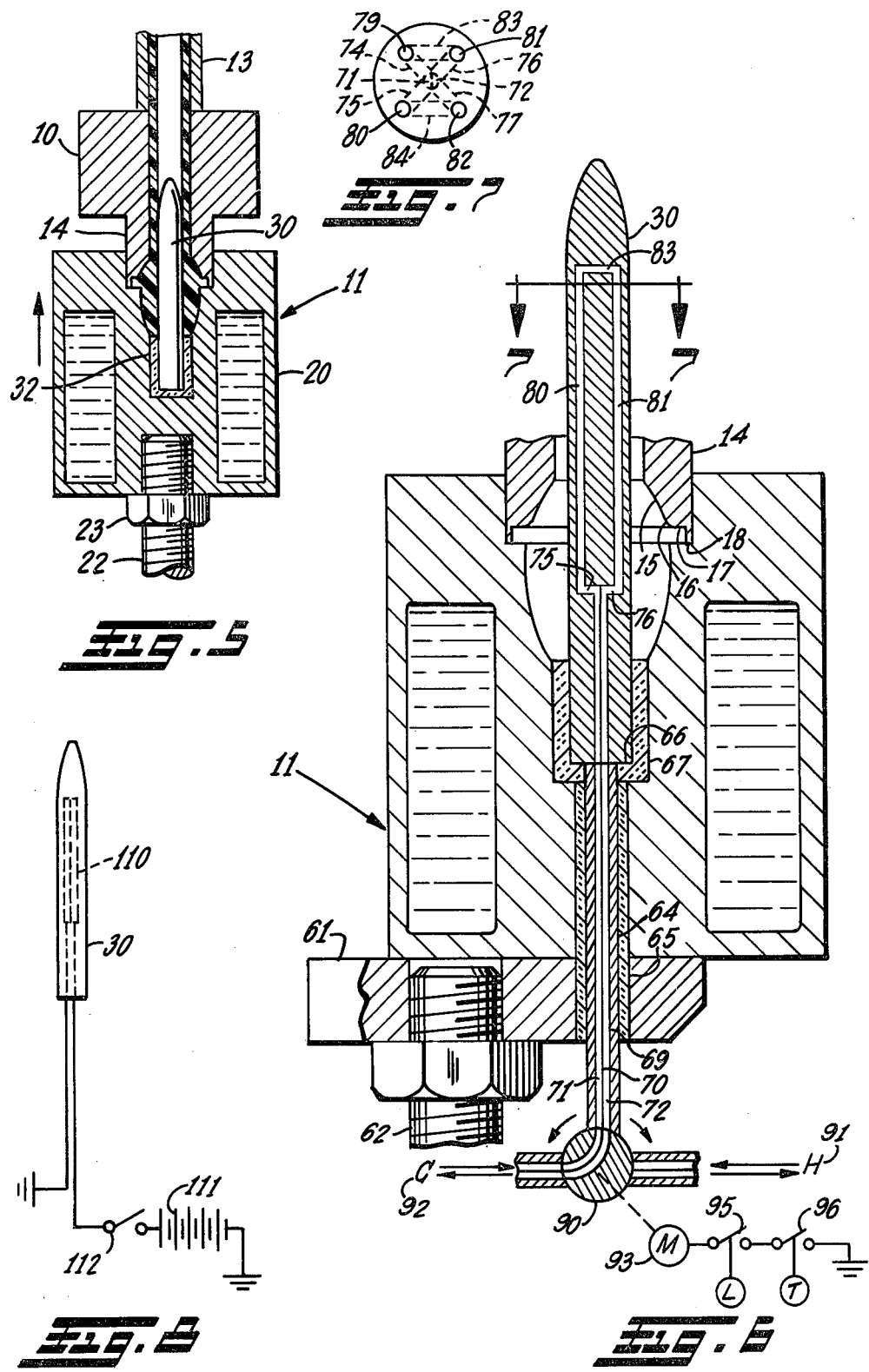

PLASTIC TUBE COUPLING AND APPARATUS FOR FORMING

RELATED APPLICATIONS

This invention relates to certain improvements in the invention of applicant's co-pending application entitled "Plastic Tube Coupling and Method of Forming Same", Ser. No. 157,395, filed June 9, 1980, now U.S. Pat. No. 4,316,870 issued Feb. 23, 1982 and is a Continuation-In-Part of such application. Such application is in turn a division of application Ser. No. 912,743, filed June 5, 1978 and now abandoned. Applicant's prior application Ser. No. 157,395 is incorporated herein by reference in its entirety.

This invention relates generally as indicated to a plastic tube coupling, and method and apparatus for forming such coupling. More particularly the present invention relates to a method and apparatus for forming plastic tubing having utility in plumbing installations.

BACKGROUND OF THE INVENTION

In plumbing installations, copper tubing has been widely employed. In risers, used for connecting tubing to fixtures or tanks, the end of the copper tubing is shaped to form a bulb sealing surface and such bulb includes a shoulder permitting the tubing and thus the bulb sealing surface to be drawn into biting or sealing engagement with the fixture. The cost of such copper tubing and the cost of forming it to permit the connection to such fixtures or tanks fluctuates frequently and widely and thus the cost may be substantial.

More recently, polybutylene has been approved for use in plumbing. Because of its flexibility, if it can properly be formed with the suitable bulb sealing surface, it is highly desirable as a tubing or plumbing material.

In order to provide such polybutylene tubing with a bulb sealing surface or an end cap for such purposes, a variety of techniques have been employed. A common technique is to employ a separately molded bulb which is spun-welded to the O.D. of the end of the tube. Another technique is to form a flange on the O.D. of the tube and again to insert a separately molded neoprene or the like concave washer on the flange for sealing purposes. Both such processes have cost and performance drawbacks.

In applicant's above noted prior copending application, there is disclosed a method of reforming plastic tube end to form such bulb sealing surface with the projecting tube end to be reformed being heated externally. A pin or mandrel on one of the forming dies or molds fits within the tubing end to maintain the I.D. of the tubing during the forming operation. The tube is formed between mating dies or molds with the tube end projecting through one of the dies or molds and onto the guide pin or mandrel projecting from the other. The mold or die from which the pin projects is normally cooled or chilled with affects the temperature of the pin. In such process, the tube end to be formed is normally heated only externally and not uniformly radially from both its inside and outside surface. The process disclosed in such prior application, while producing satisfactory tube ends, may form minute fold lines on the interior of the tube end which indicate that the reformed tube end is not completely or integrally formed. Moreover, the heating and cooling steps of the prior process are somewhat counterproductive resulting in reduced production efficiencies and increased energy consumption.

In order to provide a completely integral formed tube end, it is desirable that the tube end be uniformly heated both from its interior and its exterior. The entire wall thickness of the tubing should be brought to a uniform forming temperature and this may not be achieved by heating the tubing simply externally. Since the mandrel or pin must protect the I.D. of the tube end during forming, it is desirable that the pin also be able to provide sufficient heat to obtain such uniform heating and yet be isolated or heat insulated from the cooling or forming mold from which it projects. It is also desirable that the pin not become or remain too hot that it cannot be withdrawn from the reformed tube end without affecting the quality of the interior or I.D. surface of the reformed tube end.

SUMMARY OF THE INVENTION

With the present invention plastic tubing such as the noted extruded polybutylene is provided with a reformed end forming the tube end into a structural bulb and sealing surface which includes a stop flange permitting the tube to be drawn into sealing engagement with a mating part. In the reforming process the tube end is heated both from the interior and the exterior thus providing more uniform softening characteristics permitting the tube to be formed into the bulb sealing surface and flange integrally without fold lines or seams.

The process employed utilizes two molds or dies in a press or jig with the tube end projecting through one mold and toward the other. The other mold is normally chilled or cooled but includes an I.D. mandrel or pin projecting therefrom. The pin is insulated from the other mold and may be heated and cooled independently of such other mold.

The pin may be heated and cooled by convection being a good heat conducting material, or the pin may be heated electrically and cooled by convection or heated and cooled by circulation of fluid therethrough such as water or oil. The temperature range of the pin need not be excessive and thus it may be cycled through its temperature ranges rather quickly. In one position of the bottom mold the pin is brought to a temperature sufficient to impart the heat to the I.D. or interior of the tube end. Together with an exterior source of heat, the tube end is brought to a uniform hot temperature permitting the material of the tube readily to flow when the mold halves are brought together. When the mold halves are in their fully closed position, the heat source is of course removed and the filled bottom mold extracts heat from the reformed tube end and from the pin. Alternatively, the filling medium for the bottom mold may also be circulated through the pin causing a more rapid solidification of the reformed tube end greatly increasing the cycle time of the process.

It is accordingly a principal object of the present invention to provide a process for forming a tube end which forms a more uniform and integral tube end. It is also a principal object of the present invention to provide a process for reforming a tube end which is most efficient in time and energy consumption.

Another principal object is the provision of a process for forming a tube end wherein the tube end is heated also from the interior of the tube end to be formed.

Another object is the provision of such process and apparatus therefor wherein the interior of the tube may be heated by a pin or mandrel which is in turn heated either by convection, electrically, or by circulation of a fluid therethrough.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a fragmentary vertical section of the molds or dies employed to form the tubing in accordance with the present invention, such molds or dies being shown intermediately separated;

FIG. 2 is a view similar to FIG. 1 showing the heating elements in position surrounding the projecting pin;

FIG. 3 is a view similar to FIG. 2 showing the tube inserted through the top mold and at least partially into the heating elements;

FIG. 4 is a similar view showing the heating elements removed and the lower mold ascending;

FIG. 5 is a similar view showing the molds closed;

FIG. 6 is a somewhat enlarged sectional view of an alternative form of bottom mold illustrating the pin provided with fluid passages for the circulating of heating and cooling medium therethrough;

FIG. 7 is an enlarged horizontal section through the pin taken substantially on the line 7—7 of FIG. 6; and FIG. 8 is a schematic illustration of another form of pin which may be used with the present invention, such pin being electrically heated.

DESCRIPTION OF THE PREFERRED EMBODIMENTS

Referring first to FIGS. 1–5, there is illustrated the sequential positions of the molds for forming integrally on one end of the tubing the structural bulb sealing surface and flange, from either cut or continuous lengths of plastic tubing.

As seen in such figures the process or reforming of the tube end is carried out in a press or fixture which includes a top vertically fixed mold 10 and a vertically movable bottom mold 11. The top mold or die 10 includes a central bore 12 and a riser tube 13 secured to the top thereof having the same I.D. as the I.D. of the bore 12. The lower surface of the top mold is provided with a cylindrical projection 14 projecting centrally therefrom. The lower end of the bore is provided with a conical flaring portion 15, the lower end of which is provided with a small radius seen at 16. Radially beyond such radius, the bore is provided with an axially facing shoulder 17 which terminates in an axially extending relatively thin edge 18.

The bottom mold 11 includes a body 20 which may include an annular passage 21 for the circulation of cooling medium therethrough. The body 20 is threadedly connected to rod 22 of a piston-cylinder assembly and is adjustably locked thereon by nut 23. The top of the mold or die 11 is provided with a central recess shown generally at 25 which includes an upper cylindrical portion 26 into which the axial projection 14 of the top mold is designed closely to telescope. The lower end of the cylindrical portion 26 is provided with a shoulder 27 separating the cylindrical portion of the recess from bulb forming portion 28. The lower end of the bulb forming recess is provided with a horizontal circular axially facing end face 29 which may be somewhat larger in diameter than the diameter of the bore 12. Projecting axially from the bottom of the recess 25 is a guide pin or mandrel 30, the top of which is provided with a pilot nose or pointed portion 31. It is noted that the end face 29 of the recess 25 from which the pin 30 projects may be in the form of an insulating sleeve 32 heat isolating the pin from the bottom mold. The insulating sleeve may be in the form of a ceramic or other suitable material cup which completely separates the pin from the bottom mold.

In FIG. 1 the top and bottom molds have been brought to an intermediate position relative to each other in that the bottom mold 11 has been brought to an intermediate elevated position and the position may be determined by a retractable adjustable stop as seen at 33. In such position the pilot nose 31 of the guide pin is approximately horizontally aligned with the bottom edge of the upper mold 10.

Referring now to FIG. 2 it will be seen that the top of the guide tube 13 is provided with a backstop seen at 35 which may be pivoted to the top of the guide tube 13 for swinging movement to and from a position clear of the I.D. of such tube or over the I.D. of such tube. Instead of the backstop, an O.D. grip may be employed.

Also as seen in FIG. 2, with the molds still in their intermediate position, two heating blocks 42 and 43 are each brought into position between the open molds. The two heating blocks are each provided with electrical heating elements seen at 44 and 45, respectively, and both may be provided with semicircular vertical recesses indicated at 47 and 48, respectively, to confine the projecting pin therebetween. As noted, such blocks may be mounted for movement horizontally as indicated by the arrows 48 and 49, to and from a mating position between the mold halves and a position clear of the mold halves. In the position of FIG. 2, heat is convectively applied directly to the pin 30 from the heating elements 42 and 43. The pin may be heated without the tube in place for a relatively short time.

Now, as noted in FIG. 3, an extruded plastic tube section is inserted downwardly through the guide tube 13 to project from the lower end of the top mold 10. The dimensions of the tube both O.D. and I.D. are such that the tube will fit snugly in the O.D. of the bore 12 with the I.D. of the tube fitting snugly over the O.D. of the pin 30. The tube seen at T projects a predetermined distance below the top mold 10 and such distance can be obtained by gauging from the top, if the tube is cut to a predetermined length, or by gauging from the bottom, if for example the tube is of continuous length. The tube T may be inserted only partially into the heating element so that during the continued heating cycle the tube is heated both externally directly by the heating elements and also internally by the heated pin. In this manner the projecting end of the tube is heated for a predetermined period so that the projecting end of the tube is pliable throughout its wall thickness. In this manner the tube end can be made uniformly pliable to be integrally reformed short of a complete melt.

It will of course be appreciated that other forms of application of heat may be employed such as sonics or a heating jacket employing oil or other medium.

After the desired amount of heat is applied, the heating blocks are removed. If bottom gauges are employed, they are withdrawn. With the backstop 35 in place, the piston-cylinder assembly of the rod 22 is now further extended as seen in FIG. 4 and the projecting end of the tube T seats in the bottom face 29 of the bulb forming cavity 28 and begins to form as seen at 52. As the bottom mold 11 moves upwardly as indicated by the arrow 53, the axial projection 14 of the top mold telescopes within the cylindrical recess 26 of the bottom mold. The bottom mold continues upwardly to the position shown in FIG. 5 forming the tube end as indicated. During such movement the backstop 35 keeps the tube from moving upwardly with respect to the top mold. The piston-cylinder assembly is fully extended until the edge 18 of the top mold engages the shoulder 27. Such edge will tend to bite off or render easily removable any flash formed between the telescoping surfaces of the mold. When the molds are fully together as seen in FIG. 5, a cooling medium circulating through the passage 21 quickly chills the reformed end of the tube seen at 57. However, because of the insulation sleeve or cup 32 the pin 30 will cool less quickly with heat being extracted therefrom only through the cooling reformed tube end therearound. The cooling medium may circulate through the passage 21 continuously or only during a portion of the cycle of the process. While water is preferred as a cooling medium, it will be appreciated that cooling medium may be other fluid such as oil or gas.

After the mold has been cooled for a predetermined time, the piston-cylinder assembly of the rod 22 is fully retracted and the top mold may be indexed horizontally so that the now formed tube end may be removed. If any flash appears, it can readily be removed from the tube. The cooling time period may be sufficient to reduce the temperature of the pin to permit extraction from the reformed tube end. However, even after the pin has been retracted, it will still be quite warm and such residual heat is of course employed to reduce the cycle time that the heating elements 42 and 43 are in place. In this manner the temperature of the pin need vary through only a relatively narrow range such as plus or minus 10° C. With the insulated pin, the amount of heat required in the steps of FIGS. 2 and 3 is reduced while nonetheless obtaining a uniform radial heating of the tube end from both its interior and exterior. Thus not only is the cycle time reduced but also the required energy consumption.

Referring now to the embodiment of FIG. 6, in order even further to reduce the cooling cycle of the process, the pin may be provided with interior heating and/or cooling passages. The bottom mold 11 may again be supported for vertical movement on the rod 60 of a piston-cylinder assembly which is secured to an offset bracket 61 by nut 62. The pin includes a lower reduced diameter portion 64 which projects downwardly through the mold and through the bracket 61. A ceramic insulating sleeve 65 surrounds the reduced diameter lower portion of the pin temperature isolating it from the surrounding mold and bracket. The pin includes a shoulder 66 which seats in a shoulder at the lower end of insulating cup 67 which surrounds the pin and forms the bottom of the cavity in the lower mold 11. The pin includes a central vertical bore 69 which may be diametrically divided as indicated at 70 to form two passages on each side as seen at 71 and 72.

The central bore stops at an elevation within the bulb cavity and four radial passages extend horizontally from the bore with the two radial passages 74 and 75 extending from the passage 71 while the passages 76 and 77 extend from the passage 72. The respective passages connect to vertically offset bores, respectively seen at 79, 80, 81 and 82. At the top of the heating and cooling section of the pin, the passages 79 and 81 are connected by a passage 83 while the passages 80 and 82 are connected by a passage 84. Thus, fluid flowing upwardly through passage 72 bifurcates and then flows radially through passages 76 and 77 and then upwardly through passages 81 and 82 and then crosses over and flows downwardly through passages 79 and 80. From the passages 79 and 80, the fluid flows inwardly through radial passages 74 and 75, respectively, to the vertical passage 71. In this manner the fluid flowing centrally upwardly through the stem is distributed toward the radial surfaces of the pin in the heating or cooling zone thereof.

The passages 71 and 72 connect with a directional valve seen at 90 in FIG. 6 which may be selectively operated to connect the passages to and from either a heat source seen schematically at 91 or a coolant source seen at 92. It will be appreciated that the directional valve may be a rotary valve as illustrated or a shuttle valve, but in any event may be operated electrically by a motor or solenoid seen at 93. The motor or solenoid may be controlled to shift the valve from hot to cold or vice versa by a positional switch seen at 95 and a thermostatic switch seen at 96.

With the cycle as described above, heating medium may normally be circulated through the pin. The thermostatic switch 96 may be employed simply to maintain the pin from becoming too hot or too cold. In any event, the positional switch 95 may be employed to cause the valve to shift from a heating to a cooling position as soon as the molds move to the position seen in FIG. 5. In such condition, the pin will cool more rapidly than it would otherwise simply by the convection cooling from the chilled mold 11. In this manner this embodiment of the invention enables the cooling cycle of the process to be significantly reduced. As soon as the molds begin to separate to enable extraction of the finished reformed tube and its end from the process, the switch 95 recloses again applying heat energy to the pin so that as the process continues, when the tube is again inserted on the pin, there will be sufficient heat energy in the pin to heat the tube from its I.D. radially outwardly.

Referring now to FIG. 8, it will be seen that the cycle may further be somewhat shortened in that the heat energy to the pin may be applied internally rather than convectively and externally as seen in FIGS. 2 and 3. In this embodiment a resistance heating element may be provided in the pin 30 as seen at 110 with the electrical energy being supplied to the resistance element from source 111 through control switch 112. An additional thermostatic switch may also be provided. In any event the switch 112 cuts current flow through the resistance element 110 when the bottom mold begins to move upwardly as seen in FIG. 4. Electrical energy may again be applied to the resistance element in the pin after the pin has achieved its proper vertical position indicating it has been separated from the tube. In the case of either embodiment of FIG. 6 or FIG. 8, it will be appreciated that the time of the cycle seen in FIGS. 2 and 3 may be reduced.

In any event, there is provided a process and apparatus for reforming a tube end which includes a pin projecting in insulated fashion from a normally chilled mold. The pin may be heated and/or cooled during the reforming cycle of the process to enable uniform heating of the projecting tube end from both the inside (I.D.) and the outside (O.D.) of the tube end. The process and apparatus of the invention provides a more uniform and integral reformed tube end. The cycle time of the process may also be reduced resulting in greater productivity with less energy consumption.

Although the invention hs been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A method of reforming the end of a plastic tube between a pair of mating dies comprising the steps of controllng the temperature of a pin adapted to fit closely within the I.D. of an end of such tube independently of the temperature of the dies, placing a tube end on such pin, and then forming the tube end between the pair of mating dies to reform the tube end while maintaining the I.D. of the tube end.

2. A method as set forth in claim 1 including the step of also heating the O.D. of the tube end before the step of forming.

3. A method as set forth in claim 1 including the step of cooling the pin after forming.

4. A method as set forth in claim 1 including the step of cooling at least one of the dies after forming.

5. A method as set forth in claim 1 wherein the pin is heated externally.

6. A method as set forth in claim 1 wherein the pin is heated internally.

7. A method as set forth in claim 1 wherein the pin is heated by fluid circulation.

8. A method as set forth in claim 1 wherein the pin is heated electrically.

9. A method as set forth in claim 1 wherein the pin and the tube end are heated concurrently.

10. A method as set forth in claim 1 wherein the step of forming is obtained by telescoping dies, such pin projecting from one of said dies while the tube end projects through the other, such pin being heat insulated from the die from which it projects.

11. The method of claim 1 including the steps of heating the pin and maintaining the dies at a temperature lower than the temperature of the pin while placing the tube end on such pin.

12. A method of reforming the end of a plastic tube between a pair of mating dies comprising the steps of heating a projecting tube end from the I.D. radially outwardly on a pin while controlling the temperatures of the pin and dies independently, and then reforming the tube end while maintaining the I.D. of the tube.

13. A method as set forth in claim 12 including the step of thermally insulating the pin from the dies.

14. The method as set forth in claim 13 including the steps of heating the pin and cooling at least one of the dies to maintain the pin and the one die at different temperatures.

15. A method as set forth in claim 14 including the step of cooling the tube end after reforming.

16. A method as set forth in claim 15 including the step of cooling the reformed tube end both from the inside and outside.

17. A method as set forth in claim 16 including the step of maintaining the I.D. of the tube end by placing the tube end on an I.D. pin.

18. A method as set forth in claim 17 including the step of selectively heating or cooling the I.D. pin.

19. A method as set forth in claim 18 including the step of reforming the tube end by telescoping molds with the I.D. pin projecting from one of such molds.

20. A method as set forth in claim 19 including the step of insulating the pin from the mold from which it projects.

21. A method as set forth in claim 20 wherein the pin is heated electrically.

22. A method as set forth in claim 20 wherein the pin is heated convectively.

23. A method as set forth in claim 20 wherein the pin is heated by fluid circulation therethrough.

24. A method as set forth in claim 20 wherein the pin is heated and cooled by fluid circulation therethrough.

25. A method as set forth in claim 24 including means operative to select heated or cooled fluid for such circulation.

26. A method as set forth in claim 25 including pin position control means to select heated or cooled fluid for such circulation.

* * * * *